United States Patent [19]
Calcagno et al.

[11] 3,716,581
[45] Feb. 13, 1973

[54] PROCESS FOR PREPARING OLEFIN ESTERS

[75] Inventors: Benedetto Calcagno; Marcello Ghirga, both of Milan, Italy

[73] Assignee: Societa Italiana Resine S.p.A., Milan, Italy

[22] Filed: April 22, 1968

[21] Appl. No.: 723,255

[30] Foreign Application Priority Data

April 29, 1967 Italy.................................15535 A/67

[52] U.S. Cl. .............................. 260/497 A, 252/415
[51] Int. Cl. .............................................. C07c 67/04
[58] Field of Search....................260/497 A; 252/415

[56] References Cited

UNITED STATES PATENTS

| 3,488,295 | 1/1970 | Sennewald et al. | 260/497 A |
| 3,479,392 | 11/1969 | Stern et al. | 260/497 |

FOREIGN PATENTS OR APPLICATIONS

| 1,027,396 | 4/1966 | Great Britain | 260/497 A |

Primary Examiner—Lorraine A. Weinberger
Assistant Examiner—Richard D. Kelly
Attorney—Sughrue, Rothwell, Mion, Zinn & Macpeak

[57] ABSTRACT

A process for preparing unsatured esters from olefines and carboxylic acids is provided, in which the catalytic salts are regenerated by chlorine treatment and returned to the reaction.

13 Claims, No Drawings

PROCESS FOR PREPARING OLEFIN ESTERS

The present invention relates to a process for preparing unsaturated esters from olefines.

It is known in the art to obtain unsaturated esters by contacting an olefin with a palladium salt in a reaction medium consisting of a carboxylic acid, generally containing a small amount of water, and in the presence of a salt of the acid which ionizes under reaction conditions.

A copper (or at times iron) salt is also normally present in the reaction medium; the resulting oxidizing-catalytic system is then regenerated by molecular oxygen fed to the reaction medium.

In preparing vinyl acetate, which is the most important product in this class of compounds, ethylene together with oxygen or an oxygen-containing gas is contacted with a solution or suspension of the catalytic salts in acetic acid.

Generally, the catalytic mass is obtained by admixing to a 75–85 percent aqueous solution of the acid, palladium and copper (or iron) in the form of chlorides, whereas the salt of the acid, which is ionizable under the reaction conditions, consists of acetates of alkali and/or alkaline earth metals.

It is further possible to add the copper in part in the form of the acetate, whereas the alkali and/or alkaline earth metals can be added in part at least in the form of chlorides.

It is further known that, as the conversion reaction of the olefine to the unsaturated ester proceeds, the activity of the catalyst decreases. This effect, which becomes gradually more apparent with time, may reach an extent such as to prevent the reaction in actual practice.

A process which occurs simultaneously with the decrease in effectiveness of the catalyst is the formation of tars of an organic nature which may deposit for instance on the particles of the catalyst suspended in the acid phase, and which may cover the latter with a film which prevents its contact with the reacting substances; moreover, a decrease in the chlorine content in the catalytic mass takes place owing to elimination of chlorine in the form of volatile chlorides.

A number of tests have disclosed that optimum conversion values are obtained, all other conditions being the same, when the chlorine content in the catalytic mass ranges between 0.5 and 3.0 percent by weight.

For the sake of satisfactory progress of the olefine conversion reaction it is therefore obviously necessary to regenerate the metal chlorides and remove the tarry organic products from the reaction medium.

Methods of regenerating the said catalysts are known in the art, which employ a preliminary combustion adapted to remove the tarry products and simultaneously convert the palladium salts to palladium metal and the copper salts to their corresponding oxide. The metal chlorides are regenerated by conveniently treating the combustion residues.

The above described process is, however, subject to various drawbacks due more particularly to complexity of the equipment, strong corrosive activity in a medium operating at about 400° to 500°C, and unavoidable losses, due for instance to the volatility of the copper salts.

It has now been found that it is possible to prepare unsaturated esters from olefins, more particularly vinyl acetate from ethylene, by a simple and economically convenient process by which a low content of organic tars and a chlorine content within the desired limits may be maintained in the catalytic mass, so as to afford optimum conditions for the olefine conversion reaction.

This process, the process of the invention, is based upon the fact that the catalytic salts may be regenerated after removal of the carboxylic acid from the exhausted catalyst mass by treatment with chlorine to provide at the same time regeneration of the metal chlorides and removal of the organic tars by an oxidizing process.

By this chlorine treatment, which in its preferred embodiment is carried out on an aqueous suspension of the distillation residue following removal, conveniently by distillation, of the carboxylic acid, an aqueous solution of metal chlorides is obtainable which is directly recyclable to the reaction medium, preferably after admixing it with carboxylic acid of suitable concentration.

For the purposes of the reaction the gaseous olefin/oxygen mixture is preferably supplied in a volumetric ratio ranging between 19 and 25 to 1 and contacted in a preferably tubular reactor with the catalytic salts dissolved or suspended in the carboxylic acid.

In the preferred embodiment the gases are supplied at a rate ranging between 150 and 250 volumes to one volume catalytic mass per hour, the reaction temperature being between 100° and 110°C and the pressure being between 15 and 40 atm.

The catalytic mass is preferably obtained by admixing the metal salts with a 75–85% wt/wt aqueous solution of the carboxylic acid in order to reach the following concentrations:

alkali and/or alkaline earth metal acetate — 0.7 – 1.2 mols/liter copper (preferably cupric) chloride — 0.3 – 0.5 mols/liter palladium chloride — 0.005–0.01 mols/liter Among the alkali salts, lithium and sodium salts are preferred, and among alkaline earth salts barium salts are particularly preferable.

Whilst maintaining the concentrations within the above mentioned limits, it is possible to add the copper salt in part in the form of acetate, while the salts of the alkali and/or alkaline earth metals may be added in part at least in the form of chlorides. In regenerating the catalyst, which may be effected by a continuous or discontinuous process, the carboxylic acid is conveniently first removed in vacuo, the last traces optionally being removed with the aid of superheated steam.

The distillation residue, which is of a tarry appearance, is taken up with water and treated with chlorine, preferably while stirring the mass.

This treatment is carried out in the preferred embodiment at a temperature ranging between 70° and about 100°C, the chlorine preferably being supplied at a rate of 2 to 4 liters/hour/liter suspension over a period of about 2 to 4 hours, or at least until a clear green colored solution is obtained.

Empirically, the regeneration may be considered to be completed when carbon dioxide no longer evolves from the reaction mass.

Finally, the aqueous solution is admixed with the carboxylic acid in quantity and in a concentration such as to obtain, preferably, in the reaction medium a composition of the catalytic mass within the range given above.

The process of the invention is particularly suitable for the preparation of vinyl acetate from ethylene and acetic acid.

The process of the invention is illustrated in the following preferred Examples, which is preceded by a Comparative Run.

Comparative Run 1,000 parts by weight aqueous 85% wt/wt acetic acid are admixed with 1 part by weight palladium chloride, 52 parts cupric chloride and 315 parts barium hydroxide in the form $Ba(OH)_2 \cdot 8H_2O$. 7.5 liters of the catalytic solution are placed into an enamelled tubular reactor to the base of which 1500 Nl/h of a gaseous mixture comprising 95 percent by volume ethylene and 5 percent by volume oxygen are supplied. The reaction is carried out at a temperature of 105°C and a pressure of about 25 atm.

The gases issuing from the reactor top are cooled and the liquid products are separated from the gaseous ones by means of a gas-liquid separator.

The average composition of the liquid phase during the first 50 hours run is as follows:

| | |
|---|---|
| acetaldehyde | 13.9% by weight |
| vinyl acetate | 21.6% by weight |
| water | 15.6% by weight |
| acetic acid | 48.9% by weight |

The yield calculated over the same period of time amounts to 74.8 g per liter reactor/h in respect of acetaldehyde and 105 g/liter reactor/h in respect of vinyl acetate.

The reaction is continued for a total period of 80 hours, when the effectiveness of the catalyst is reduced to about one half. Analysis discloses a chlorine content in the catalytic mass on completion of reaction of about 0.2% wt/wt.

Example 1

Under exactly the same initial conditions as the Comparative Run the conversion reaction of ethylene to vinyl acetate was carried out for 30 hours. At the end of this period two liters of the catalytic mixture were taken and placed into a glass reactor provided with a stirrer.

Acetic acid was removed as far as possible in vacuum, its last traces being removed by admitting steam. The tarry residue was taken up with about 2 l water, a suspension of dark brown color being obtained.

Chlorine at a rate of 7 to 8 l/hour calculated at room pressure was admitted to the stirred suspension maintained at about 100°C. After about 3 hours carbon dioxide was no longer evolved and a clear green colored solution was obtained containing only traces of organic compounds (in fact, 5 ml. of this solution consume after precipitation of the chlorine ions present 3-4 ml 0.1 N $KMnO_4$).

The solution of the catalytic salts of chlorine concentration of about 9 to 10 percent after concentration to remove excess water, was brought back to two liters volume with 85 percent acetic acid and was re-admitted to the reaction medium.

The conversion reaction of ethylene to vinyl acetate was continued for a further 3 hours under the conditions described.

The average yield of acetaldehyde and vinyl acetate was almost unaltered during the two runs and amounted to 80 g/liter reactor/hour in respect of acetaldehyde and 100 g/liter reactor/hour in respect of vinyl acetate, respectively.

This Example shows that the catalyst is effectively regenerated.

Example 2

1000 parts by weight 80% wt/wt aqueous acetic acid titrating about 80 percent were admixed with 1 part by weight palladium chloride $PdCl_2$, 52 parts cupric chloride $CuCl_2$, 12 parts lithium chloride and 48 parts lithium acetate.

8.0 liters of the catalytic suspension were placed into an enamelled tubular reactor to the base of which 1,500 Nl/hr of a gaseous mixture comprising 95 percent by volume ethylene and 5 percent by volume oxygen were fed.

The reaction was carried out at a temperature of 100°C and a pressure of about 23 atm.

After 5 hours run, continuous withdrawing of the catalytic mass was started at a rate of about 100 ml/hour, the mass being regenerated as in Example 1 followed by continuously returning it to the reaction medium.

A low tar content was thereby maintained in the catalytic mass, the chlorine content amounting to about 2.5 percent by weight.

During a 400 hour run the acetaldehyde and vinylacetate production remained almost constant and amounted to about 80 and 110 g/liter reactor/h, respectively.

This Example illustrates effective maintenance of the catalyst over a long period.

What is claimed is:

1. In a liquid phase process for preparing vinyl acetate from ethylene, acetic acid and oxygen by contacting a gaseous mixture of ethylene and an oxygen containing gas in a reaction zone with a liquid catalytic reaction medium consisting essentially of:
   i. aqueous acetic acid at an acid concentration of 75 to 85 percent by weight,
   ii. 0.3 to 0.5 mol/liter of a member selected from the group consisting of copper chloride and copper acetate,
   iii. 0.005 to 0.01 mol/liter of palladium chloride and 0.7 to 1.0 mol/liter of a member selected from the group consisting of alkali metal chlorides, alkali metal acetates, alkaline earth metal chlorides, alkaline earth metal acetates and mixtures thereof;
   wherein organic tars are formed in said liquid catalytic reaction medium and the catalytic activity decreases with time,
   the improvement comprising removing said organic tars from the liquid catalytic medium by withdrawing at least a portion of said liquid catalytic reaction medium from said reaction zone after conducting said process for a period of time sufficient to at least partially exhaust said liquid catalytic reaction medium and regenerating said catalytic reaction medium by:

distilling acetic acid from the withdrawn portion of the catalytic reaction medium to yield a distillation residue;

contacting said distillation residue with super-heated steam to thereby remove any remaining traces of acetic acid;

suspending the resulting distillation residue in water to yield an aqueous suspension;

passing gaseous chlorine into said aqueous suspension at a rate of 2 to 4 liters per hour per liter of the suspension for a period of time of from 2 to 4 hours at a temperature of from 70° to 100°C; and mixing acetic acid with the aqueous suspension which has been treated with gaseous chlorine to re-establish the catalytic reaction medium and thereafter recycling said catalytic reaction medium in liquid form to said reaction zone to thereby maintain the catalytic reaction medium in said reaction zone.

2. The process of claim 1 wherein the alkali metal is selected from the group consisting of lithium and sodium and the alkaline earth metal is barium.

3. The process of claim 1 wherein the process for preparing vinyl acetate is conducted under the following conditions: at an ethylene/oxygen gaseous volumetric ratio ranging between 19 and 25 to 1 and at a total flow rate of from 150 to 250 volumes to 1 volume of the catalytic reaction medium per hour, reaction being conducted at a temperature between 100° and 110°C and at a pressure between 15 and 40 atmospheres.

4. The process of claim 1 wherein a chloride content of 0.5 to 3.0 percent by weight is maintained in the catalytic reaction medium during the production of vinyl acetate.

5. The process of claim 1 wherein said distillation is a vacuum distillation.

6. The process of claim 1 wherein said aqueous suspension is treated with gaseous chlorine whereby carbon dioxide is evolved, and said treatment with chlorine is continued until carbon dioxide is no longer evolved from the chlorine-treated aqueous suspension and a green-colored solution results.

7. The process of claim 1 wherein said catalytic reaction medium consists essentially of copper chloride, palladium chloride, a member selected from the group consisting of alkali metal chlorides, alkaline earth metal chlorides and mixtures thereof, comprising removing the spent catalytic reaction medium from the process for the production of vinyl acetate and, after re-establishing the catalytic reaction medium, recycling the catalytic reaction medium to the process for the production of vinyl acetate, whereby a chloride content of 0.5 to 3.0 percent by weight is re-established in the catalytic reaction medium and organic tars present with said spent catalytic mixture are removed.

8. The process of claim 1 wherein said catalytic reaction medium consists essentially of aqueous acetic acid at an acid concentration of 75 to 85 percent by weight, 0.3 to 0.5 mols/liter of a member selected from the group consisting of copper chloride and copper acetates, 0.005 to 0.01 mols/liter of palladium chloride and 0.7 to 1.2 mols/liter of a member selected from the group consisting of alkali metal chlorides, alkali metal acetates, alkaline earth metal chlorides, alkaline earth metal acetates and mixtures thereof, and said catalytic reaction medium is withdrawn from said reaction zone after said reaction has proceeded for a time sufficient to result in the formation of tars, the amount of said tars being reduced during said regeneration process, whereafter said re-established catalytic reaction medium is recycled to said reaction zone.

9. The process of claim 1 wherein said catalytic reaction medium is an aqueous solution.

10. The process of claim 1 wherein said catalytic reaction medium is an aqueous suspension.

11. The process of claim 1 wherein said catalytic reaction medium illustrates a reduced chlorine content prior to regeneration as compared to subsequent to regeneration, said reduced chlorine content being due to the elimination of volatile chlorides during the preparation of vinyl acetate.

12. The process of claim 1 wherein said re-established catalytic reaction medium is recycled to said reaction zone as an aqueous solution.

13. The process of claim 1 wherein said catalytic reaction medium consists essentially of palladium chloride, cupric chloride, and a member selected from the group consisting of an alkali metal acetate or an alkaline earth metal acetate, in aqueous acetic acid.

* * * * *